(12) United States Patent
Gara et al.

(10) Patent No.: US 8,671,311 B2
(45) Date of Patent: Mar. 11, 2014

(54) MULTIPROCESSOR SWITCH WITH SELECTIVE PAIRING

(75) Inventors: Alan Gara, Mount Kisco, NY (US); Michael K. Gschwind, Chappaqua, NY (US); Valentina Salapura, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 13/027,882

(22) Filed: Feb. 15, 2011

(65) Prior Publication Data
US 2012/0210172 A1 Aug. 16, 2012

(51) Int. Cl.
*G06F 11/00* (2006.01)
(52) U.S. Cl.
USPC .................................. 714/11; 714/10; 714/12
(58) Field of Classification Search
USPC ...................................................... 714/10–12
See application file for complete search history.

(56) References Cited

U.S. PATENT DOCUMENTS

| | | | |
|---|---|---|---|
| 5,388,215 A | 2/1995 | Baker et al. | |
| 5,745,672 A | 4/1998 | Stiffler | |
| 5,751,955 A | 5/1998 | Sonnier et al. | |
| 5,964,835 A | 10/1999 | Fowler et al. | |
| 5,970,226 A | 10/1999 | Hoy et al. | |
| 6,141,770 A | 10/2000 | Fuchs et al. | |
| 6,393,582 B1 | 5/2002 | Klecka et al. | |
| 6,772,368 B2* | 8/2004 | Dhong et al. | 714/11 |
| 6,862,693 B2* | 3/2005 | Chaudhry et al. | 714/11 |
| 6,948,092 B2 | 9/2005 | Kondo et al. | |
| 7,058,855 B2 | 6/2006 | Rohfleisch et al. | |
| 7,065,672 B2 | 6/2006 | Long et al. | |
| 7,155,721 B2 | 12/2006 | Safford et al. | |
| 7,287,185 B2 | 10/2007 | Safford et al. | |
| 7,290,169 B2* | 10/2007 | Safford et al. | 714/11 |
| 7,328,371 B1 | 2/2008 | Kalyanasundharam et al. | |
| 7,343,436 B2 | 3/2008 | Atago | |
| 7,398,419 B2 | 7/2008 | Safford et al. | |

(Continued)

FOREIGN PATENT DOCUMENTS

| | | |
|---|---|---|
| GB | 2425380 B | 9/2009 |
| JP | 58-056062 | 4/1983 |

(Continued)

OTHER PUBLICATIONS

Siewiorek, et al., "C.vmp: The Analysis, Architecture and Implementation of a Fault Tolerant Multiprocessor", IP.com, IPCOM000148040D, Original publication date: Dec. 31, 1976, IP.com Electronic publication date: Mar. 28, 2007, Database entry Copyright (c) Software Patent Institute.

(Continued)

*Primary Examiner* — Philip Guyton
(74) *Attorney, Agent, or Firm* — Scully, Scott, Murphy & Presser, P.C.; Daniel P. Morris, Esq.

(57) ABSTRACT

System, method and computer program product for a multiprocessing system to offer selective pairing of processor cores for increased processing reliability. A selective pairing facility is provided that selectively connects, i.e., pairs, multiple microprocessor or processor cores to provide one highly reliable thread (or thread group). Each paired microprocessor or processor cores that provide one highly reliable thread for high-reliability connect with a system components such as a memory "nest" (or memory hierarchy), an optional system controller, and optional interrupt controller, optional I/O or peripheral devices, etc. The memory nest is attached to a selective pairing facility via a switch or a bus.

29 Claims, 12 Drawing Sheets

(56) References Cited

U.S. PATENT DOCUMENTS

| | | |
|---|---|---|
| 7,426,614 B2 | 9/2008 | Bruckert et al. |
| 7,526,442 B2 | 4/2009 | Edgar et al. |
| 7,568,063 B2 * | 7/2009 | Gostin et al. .................. 710/317 |
| 7,613,948 B2 | 11/2009 | Hillman et al. |
| 7,669,079 B2 * | 2/2010 | Weiberle et al. ................. 714/10 |
| 7,941,698 B1 * | 5/2011 | Aggarwal et al. ............... 714/11 |
| 8,051,323 B2 * | 11/2011 | Pathirane et al. ............... 714/10 |
| 2002/0144177 A1 | 10/2002 | Kondo et al. |
| 2005/0197718 A1 | 9/2005 | Shin et al. |
| 2005/0223178 A1 | 10/2005 | Garcia et al. |
| 2005/0240806 A1 | 10/2005 | Bruckert et al. |
| 2006/0242645 A1 | 10/2006 | Codrescu et al. |
| 2007/0061812 A1 | 3/2007 | Safford et al. |
| 2010/0042871 A1 | 2/2010 | Wendorff et al. |
| 2011/0185125 A1 * | 7/2011 | Jain et al. ...................... 711/122 |

FOREIGN PATENT DOCUMENTS

| | | |
|---|---|---|
| JP | 09-160793 | 6/1997 |
| JP | 2006-058984 | 3/2006 |
| JP | 2009098988 A2 | 5/2009 |

OTHER PUBLICATIONS

Chiu et al., "A Genetic Algorithm for Reliability-Oriented Task Assignment with k Duplications in Distributed System", IEEE Transactions on Reliability, vol. 55, No. 1, Mar. 2006, pp. 105-117.

Hammond et al., "The Stanford Hydra CMP", IEEE Mar.-Apr. 2000, pp. 71-84.

Hammond et al., "Transactional memory coherence and consistency", Proceedings of the 31st annual International Symposium on Computer Architecture (ISCA), pp. 102-113, 2004.

Herlihy et al., "Transactional memory: Architectural support for lock-free data structures", Proceedings of teh 20th International Symposium on Computer Architecture (ISCA), pp. 289-300, 1993.

Office Action dated Jun. 5, 2013, received in a related U.S. Appl. No. 13/027,932.

* cited by examiner

MULTIPROCESSOR SWITCH WITH SELECTIVE PAIRING

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. B554331 awarded by the United States Department of Energy.

The present invention relates generally to fault tolerant multi-processor computing systems and particularly to a novel system and method for highly-reliable mode of computing operations. More particularly, there is provided a chip multiprocessor switch with selective processor core pairing in order to enable an information handling system to offer both high reliability and high performance operation modes.

BACKGROUND

Some multiprocessor systems exist today that have been designed to offer increased reliability using paired microprocessor cores. An exemplary system is described by Timothy J. Slegel et al. IBM'S S/390 G5 MICROPROCESSOR DESIGN, IEEE MICRO, March 1999, which has been used to achieve industry-leading reliability. However, this prior art design is based on an approach that completely duplicates an I (Instruction) unit and E (Execution) unit of the core. That is, on every clock cycle, signals coming from these units, including instruction results, are cross-compared in a R (Reliability) unit and the L1 cache. If the signals don't match, hardware error recovery is invoked. This checking scheme solves the problems associated with traditional checking, although at an additional cost in die area.

The R unit and L1 cache use traditional error-checking approaches. All arrays in a L1 cache unit are protected with parity except for the store buffers, which are protected with ECC. Since the L1 is a store-through design, another valid copy of the data will always be in L2 or in memory. As an aside, since the L2 is a store-in design, it is protected by ECC, because it often holds the only valid copy of data. If the R unit or L1 cache detects an error, the processor automatically enters an error recovery mode of operation. This process is done purely in hardware without any millicode intervention, since the processor may be in some indeterminate state that may not be able to run millicode. This error recovery mode also lets the processor recover while it is executing in millimode.

While this design approach has offered high reliability, the duplicated resources were not available even when high reliability was not required. However, some classes of applications offer natural resilience, and it is advantageous to enable systems with higher performance when executing such algorithms. Examples of such algorithms are digital content creation and graphics processing, where deviations from the numerically correct results are not noticed by viewers; and convergence-based algorithms, wherein a corrupted numeric value may increase the runtime, but not impact final result correctness.

Thus, for example, a soft error occurring at a low-order mantissa bit may cause one or two additional iterations to be performed, but making twice the number of cores available to the application will result in an overall speedup.

A single system may be used to execute resilient programs (e.g., financial forecasting and simulation), and those requiring high accuracy (e.g., financial transactions), either simultaneously, or at different times. A single application may also consist of components requiring high reliability, and those being naturally resilient.

FIG. 1 shows a prior art multiprocessor system 10 including multiple processor cores $12a, \ldots, 12n$ (such as embedded on a single chip or system on Chip (SoC) interfaced with system components 14 comprising, for example, memory nest, interrupt controller, etc. Each core $12a, \ldots, 12n$ communicates with system components, e.g., by receiving respective input signals $20a, \ldots, 20n$, and sending output signals $25a, \ldots, 25n$.

A prior art multiprocessor system described in U.S. Pat. No. 7,065,672 entitled "Apparatus and methods for fault-tolerant computing using a Switching Fabric" describes a computer system having a switching fabric that communicates transactions asynchronously between data processing elements and a target processor. While this application describes a method for determining correct execution, voting is performed between a plurality of processors, the processors are not to be independently used, and are not shown to be independently usable for lack of switching fabric access. Furthermore, this prior art configuration is dependent upon the features of asynchronous switching networks and the operation of peripheral devices.

Current fault-tolerant systems do not enable both processors to provide independent operation when computational processes are naturally resilient, nor do they enable pairwise execution and checking when they are not.

It would be highly desirable to provide a system and method that provides a pairing facility that enables selective pairing of microprocessors for high reliable (fault-tolerant) implementations under software control.

SUMMARY

There is provided a system, method and computer program product for a multiprocessing system that offers selective pairing of processor cores for increased processing reliability. In this aspect, the system includes a switch to selectively pair two cores to provide one highly reliable thread (or thread group) or independently operate two cores to provide two independent threads (thread groups). Software is provided to schedule a highly reliable thread on the pairable set of cores.

The present invention provides methods and apparatus for configuring a system to use either paired execution of microprocessor cores wherein a single program is executed twice and results are compared for increased reliability, or to configure such cores as independent cores to offer higher overall system performance.

Accordingly, there is provided a multiprocessing computer system comprising: a memory system including a memory storage device; at least two processor cores in communication with the memory system; a pairing sub-system adapted to dynamically configure two of the at least two processor cores for independent parallel operation in response to receipt of first configuration information, the pairing sub-system providing at least two separate signal I/O paths between the memory system and each respective one of the at least two processor cores for the independent parallel operation, and, the pairing sub-system adapted to pair two of the at least two processor cores for fault tolerant operations in response to receipt of second configuration information, the pairing sub-system providing a common signal path for forwarding identical input data to each the paired two processor cores for simultaneous processing thereat; and, decision logic device, in the pairing sub-system, for receiving an output of each the paired two processor devices and comparing respective output results of each, the decision logic device generating error indication upon detection of non-matching output results.

In a further aspect there is provided a method for performing highly-reliable fault tolerant operations in a multiprocessing system including at least two processor cores in communication with a memory system, the method comprising: dynamically configuring, in a pairing sub-system, two of the at least two processor cores for independent parallel operation mode in response to receipt of first configuration information at the pairing sub-system, the dynamic configuring in response to receipt of first configuration information includes providing at least two separate signal I/O paths between the memory system and each respective one of the at least two processor cores for the independent parallel operation, and, dynamically configuring, in the pairing sub-system, two of the at least two processor cores for paired fault tolerant operation mode in response to receipt of second configuration information, the dynamic configuring in response to the second configuration information includes providing a common signal path for forwarding identical input data to each the paired two processor cores for simultaneous processing thereat; and, receiving, at a decision logic device in the pairing sub-system, an output of each the paired two processor devices in the paired fault tolerant operation mode; comparing respective output results of each the paired two processor devices; and, generating, at the decision logic device, an error indication upon detection of non-matching output results.

A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

In one aspect, there is provided a selective pairing facility that selectively connects, i.e., pairs, multiple microprocessor or processor cores to provide one highly reliable thread (or thread group). Each paired microprocessors or processor cores that provide one highly reliable thread for high-reliability connect with a system components such as the "memory nest" (or memory hierarchy), an optional system controller, and optional interrupt controller, optional I/O or peripheral devices, etc. The memory nest is attached to a selective pairing facility via a switch or a bus.

For purposes of description, a thread is understood as a single thread of control, represented by a set of architected processor state resources and including a current instruction address. A thread group is a plurality of threads, each thread represented by a set of architected processor state resources and including a current instruction address. According to one embodiment, using selective pairing on a microprocessor executing a single thread of control will yield a single, more reliable thread. Using selective pairing on a microprocessor executing multiple threads of control (wherein the same threads are replicated on the paired cores) will yield a group of reliable threads that are simultaneously being paired and executed redundantly. Pairing may be used on a group of threads in a multi-threaded core to achieve a reliable multi-threading core.

In one aspect, the apparatus implements a method and computer program product including instructions executed by a host or processor system for configuring two hardware cores as a single highly reliable core using the selective pairing facility, and further, to deconfigure a highly reliable core into two separate cores. Further, the method includes scheduling an application, or a portion thereof, to a highly reliable core responsive to an indication that said application (or application portion) should be executed on a reliable core. Likewise, the method and computer program product including executable instructions may further schedule an application, or portion thereof, to a single unreplicated core responsive to an indication that said application (or application portion) is resilient.

Figure 1:
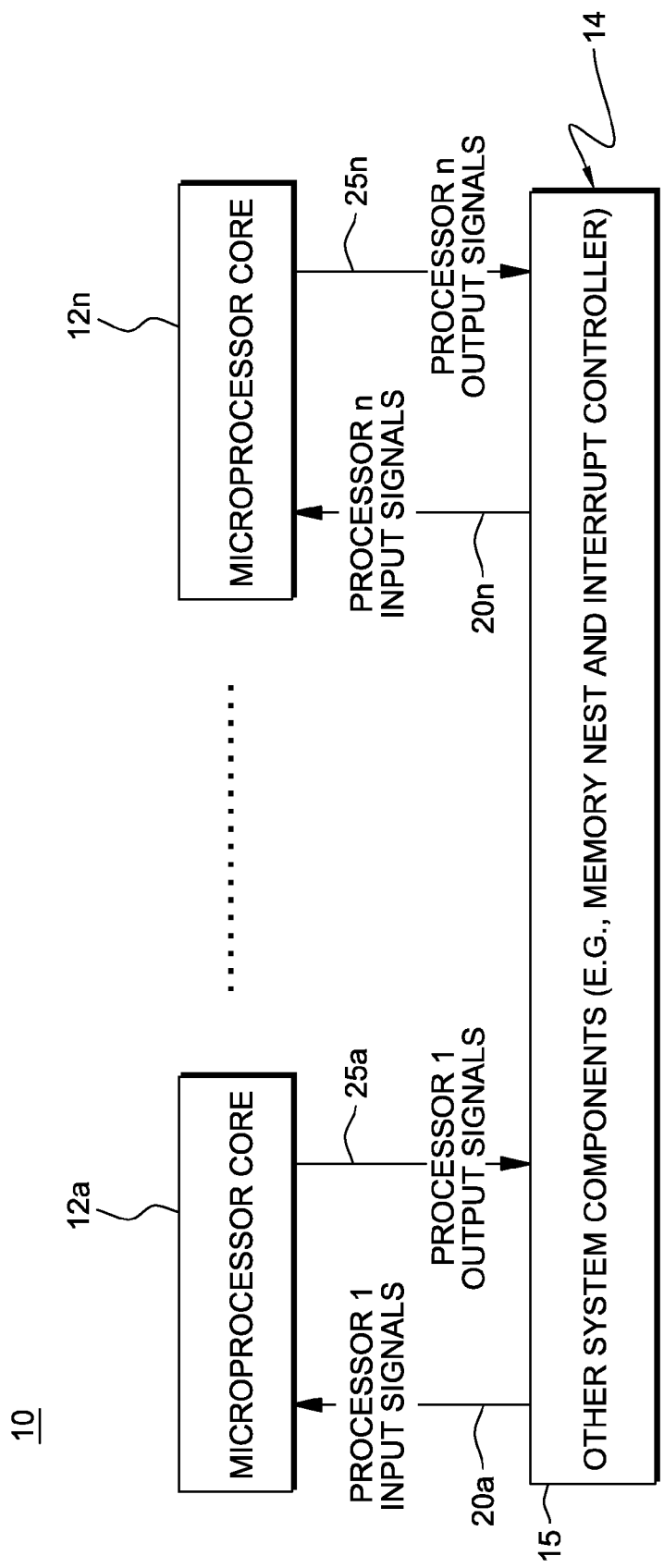
FIG. 1 an example prior art dual processor system interfaced with system components.
Figure 2:
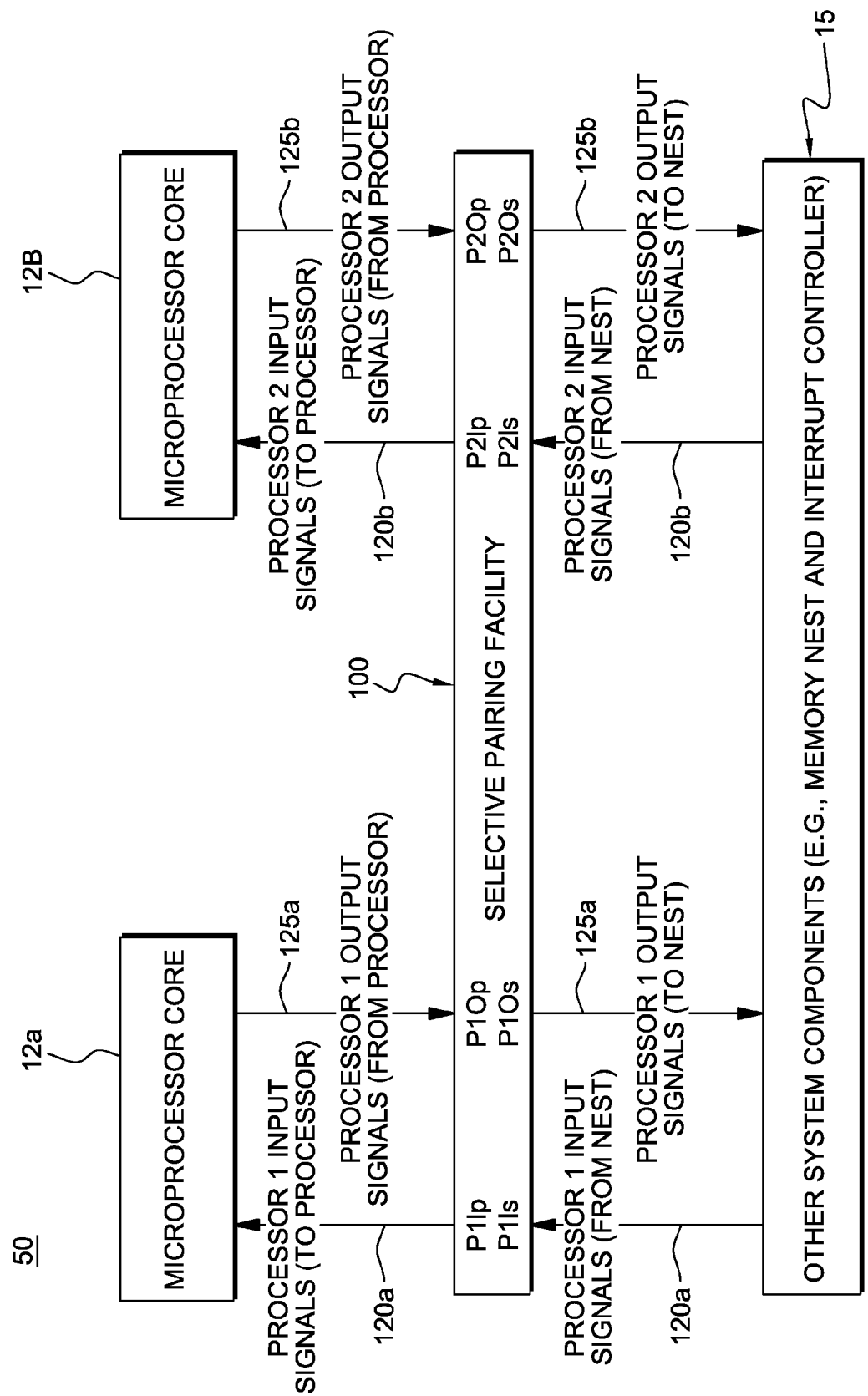
FIG. 2 depicts the system and method for selective pairing of microprocessor cores in accordance with one embodiment.

FIG. 2 depicts the system and method for selective pairing of microprocessor cores in accordance with one embodiment. Particularly, FIG. 2 depicts a highly-reliable computing system 50 that includes a selective pairing facility 100 shown interfaced to and connecting exemplary two processor cores 12a, 12b with a system interconnect 15 to connect to system components such as system memory, e.g., memory "nest". In one embodiment, each core 12a, 12b communicates with the system interconnect 15 via respective input/output signal conductors through the pairing facility 100. For example, input signals are provided over conductor 120a from a system interconnect to a processor core 12a via a configured pairing facility 100 and processor/core output signals are provided over conductor 125a from processor core 12a to the system interconnect 15 via a configured pairing facility 100. Likewise, input signals are provided over conductor 120b from a system interconnect to processor core 12b via a configured pairing facility 100 and processor output signals are provided over conductor 125b from processor core 12b to the system interconnect 15 via a configured pairing facility 100.

In the manner as will be explained in greater detail herein below, the selective pairing facility 100 includes a switching system and intelligence that is embedded or otherwise integrated within a crossbar switch or like switching system, for real-time connecting pairs of microprocessor for highly-reliable operations. In one example, commands for configuring the selective pairing facility for connecting pairs of microprocessor for highly-reliable operations are provided in real-time, during a program execution.

Figure 3A:
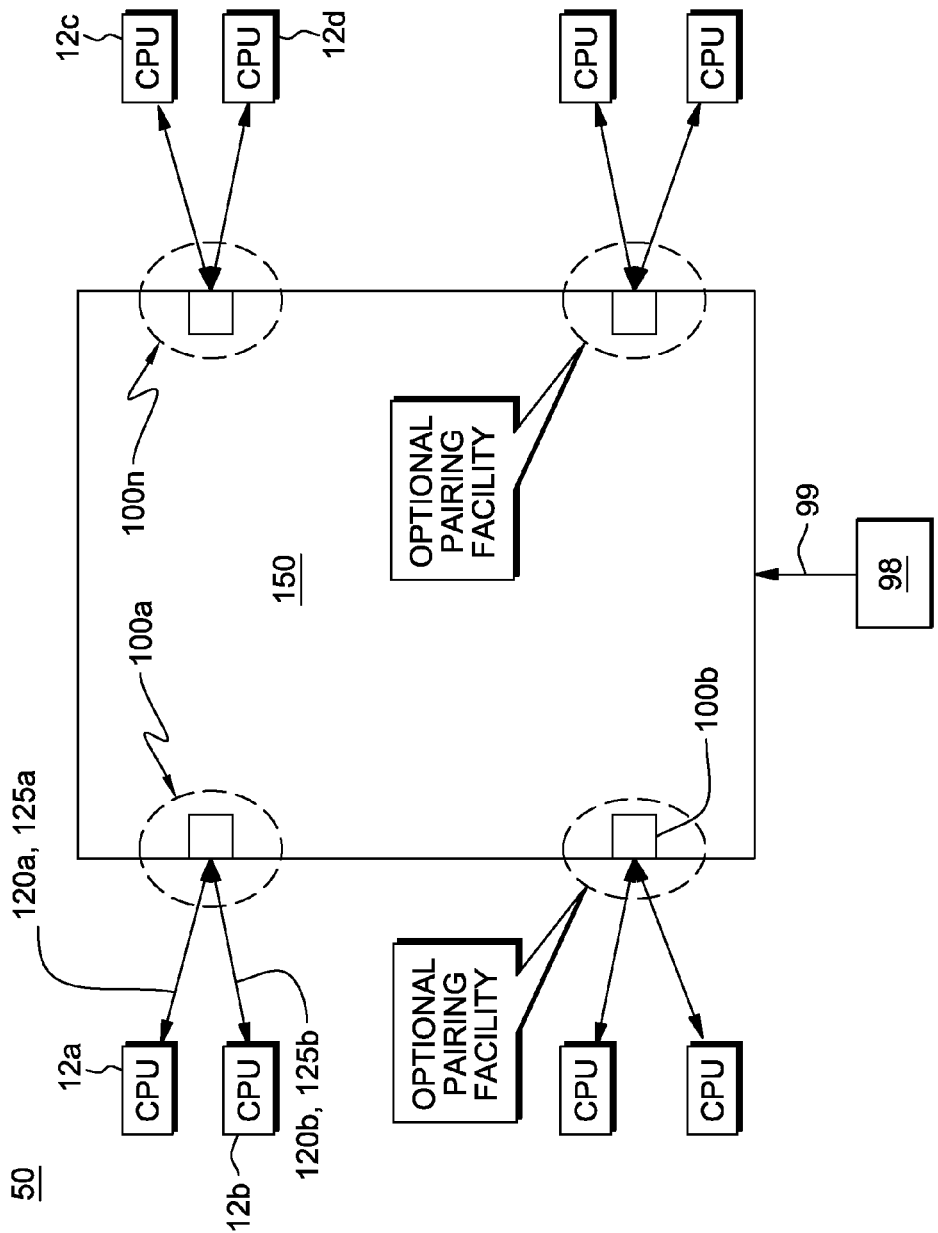
FIGS. 3A and 3B depict several pairing facilities 100a, 100b, . . . , 100n configurable within a switching system, which, in one embodiment, includes a crossbar switch 150 as shown in FIG. 3A, or, bus device 175 as shown in FIG. 3B, according to alternate embodiments.
Figure 3B:
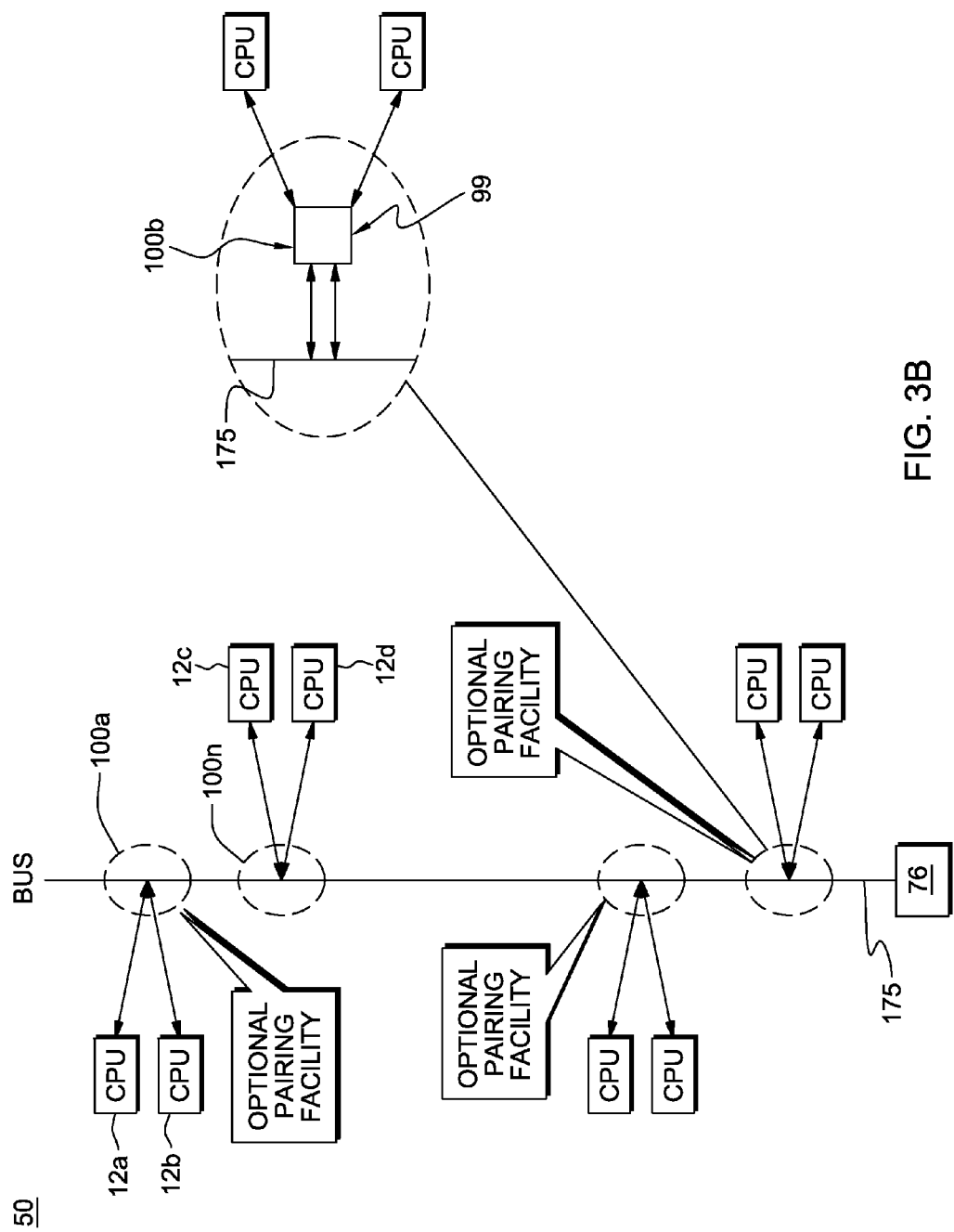

For example, as shown in FIGS. 3A and 3B, several pairing facilities 100a, 100b, . . . , 100n are configurable within a switching system, which, in one embodiment, includes a crossbar switch 150 as shown in FIG. 3A, or, as shown in FIG. 3B, a bus device 175, that enables highly-reliable operations for two or more microprocessor cores that are paired via the pairing facility in response to selective pairing instruction signals 99. Thus, in accordance with one embodiment, responsive to receipt of a selective pairing instruction signal 99 executed via a separately running program application (or application part) or program application running at one of the processor cores to be paired, a selective pairing facility 100a, 100b, . . . , 100n, etc. can be configured for pairing the two processor cores, e.g., to run as a highly-reliable single thread. For example, in FIG. 3A, signal 99, such as a configuration signal generated from an Operating System (O/S), a scheduler 98, user program, control program and/or programmed configuration registers (not shown), initiates the hardware configuration of a pairing facility 100a for pairing, in real-time, example processor cores 12a, 12b within switching system 150 and/or initiates hardware configuration of pairing facility 100n for pairing, in real-time, example processor cores 12c, 12d within switching system 150. Likewise, in the embodiment depicted in FIG. 3B, selective pairing configuration signal 99 may be input to a selected pairing facility, e.g., 100a, to configure a pairing facility 100a within bus switching system 175 for pairing, in real-time, example processor cores 12a, 12b, and a pairing facility 100n for pairing, in real-time, example processor cores 12c, 12d. A single pairing facility 100b shown enlarged within dotted circle in the embodiment depicted in FIG. 3B provides two sets of conductors, one set for interfacing between the CPUs and the facility and one set for interfacing between the facility and the bus 175 and is shown receiving selective pairing configuration signal 99, e.g., from a scheduler 76. It is understood that one or more pairing facilities 100a, 100b, . . . , 100n for enabling highly-reliable processor core operations is configurable during a single program execution.

Figure 3C:
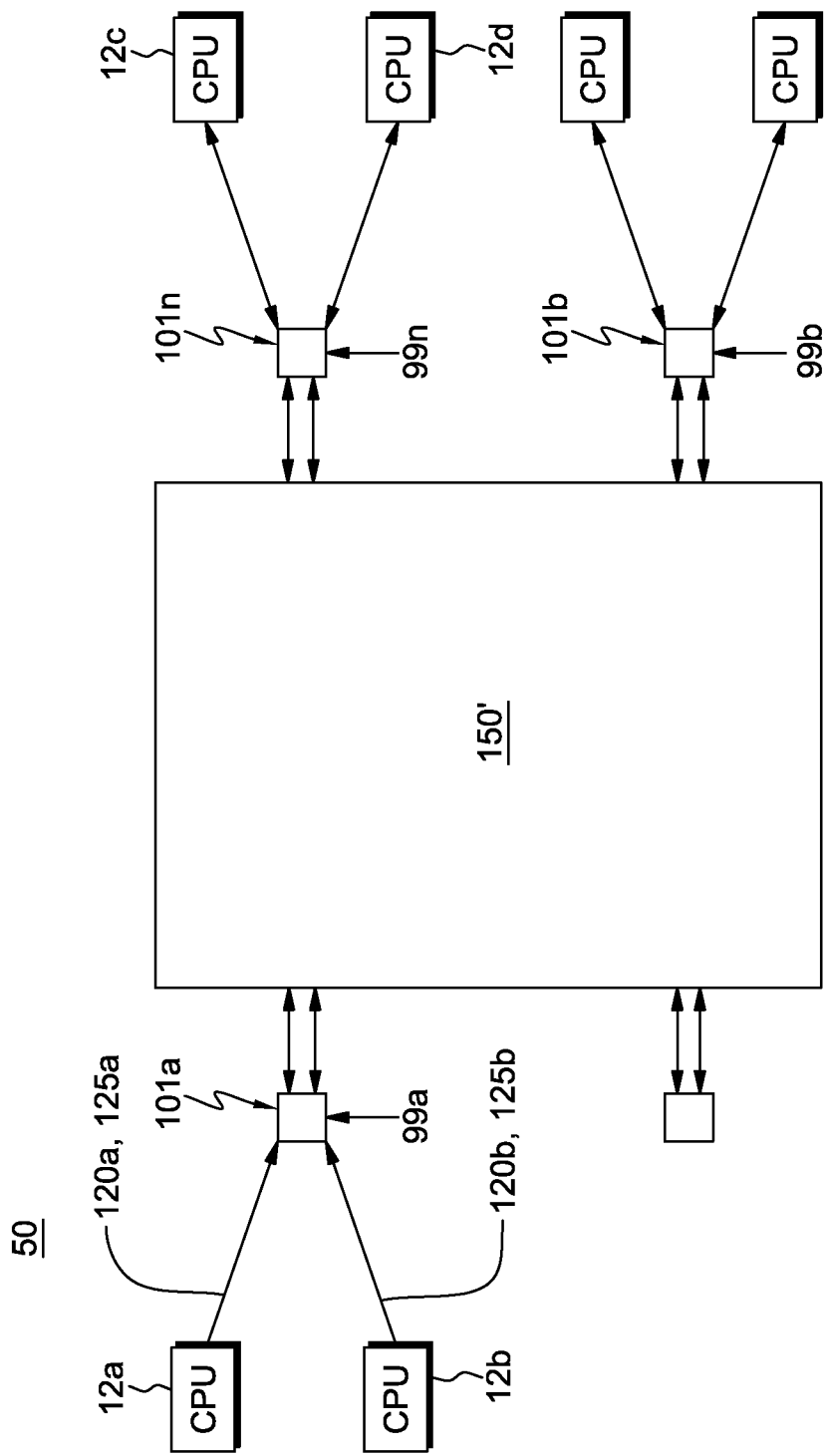
FIG. 3C depicts an alternative embodiment implementing a switch 150' configured to interface with a plurality of external interfacing selective pairing facility hardware modules in one embodiment.

As an alternative embodiment to the embodiment implementing a crossbar switch 150 such as shown in FIG. 3A wherein selective microprocessor pairing is accomplished via facilities 100a, 100b, etc. internal to the switch 150, a crossbar switch 150' such as shown in FIG. 3C, is configured to have a plurality of external interfacing selective pairing facility hardware modules 101a, 101b, . . . , 101n that interface with the switch to receive configuration signals 99 in addition to wired input/output signals from the selected pairs of microprocessors, e.g., 12a, 12b or 12c, 12d, etc. A single pairing facility 101a shown in the embodiment depicted in FIG. 3C includes two sets of conductors 120a, 125a and 120b, 125b, one set for interfacing between each CPU and the facility and one set for interfacing between the facility and the switch 150'.

It is understood that configuration signals 99 received at the selective pairing facilities includes those configuration and control signals such as generated by the operating system (O/S), including signals from a scheduler component 76, 98 for allocating processing threads on a single or paired cores as described herein, and which includes configuration registers populated with data from the user program whether for a single processor core or paired processor cores for running high reliability mode operations. In one embodiment, each pairing facility 101a to 101n in FIG. 3C receives its own configuration signal 99a . . . 99n to be configured independently.

In the embodiments depicted, the system 50 is designed for operation with a variable number of cores 12a, . . . , 12n. Thus, for example, a system with an amount "2n" hardware cores in a design can make available an amount "n" selected pair cores, and 2n cores to be assigned to software. When a system has an amount "n" cores available, all cores have been paired for increased reliability resulting in the software being able to use n highly reliable cores. When a system has 2n cores, and no cores have been paired, this results in 2n cores being available for applications with high performance needs. In a system which has a number of cores between n and 2n cores being available to software corresponds to a system wherein some cores have been made highly reliable to execute applications (or application parts) requiring high reliability, whereas another set of cores is available to execute other applications (or application parts) requiring higher performance and being more inherently reliable.

In another aspect of the present invention, each of the selected microprocessor core pairs, e.g., 12a, 12b or 12c, 12d can be heterogeneous, and are selected to accommodate a particular type of high-reliability processing. Thus, for example, if certain processing speed, registers, check or memory considerations are required, certain processor cores, e.g., 12a, 12b may be the best fit for that calculation, and these processor cores may be paired that are better adapted for handling these particular types of high-reliability processing operations. In one embodiment, the processors which can be paired are fixed, and if reliable processing is needed, but one of the cores is not available, an OS or scheduler intervenes to enable the selected cores to become paired. The configuration signal 99 includes a trigger received at the switch to identify the particular microprocessors known to accommodate a particular type of high-reliability processing and the pairing facility 100 responds by configuring the switch 150, 175 to configure a selected pair facility, e.g., 100a, for handling the requested type of high-reliability (e.g., single thread) processing at the requested microprocessors.

Figure 4A:
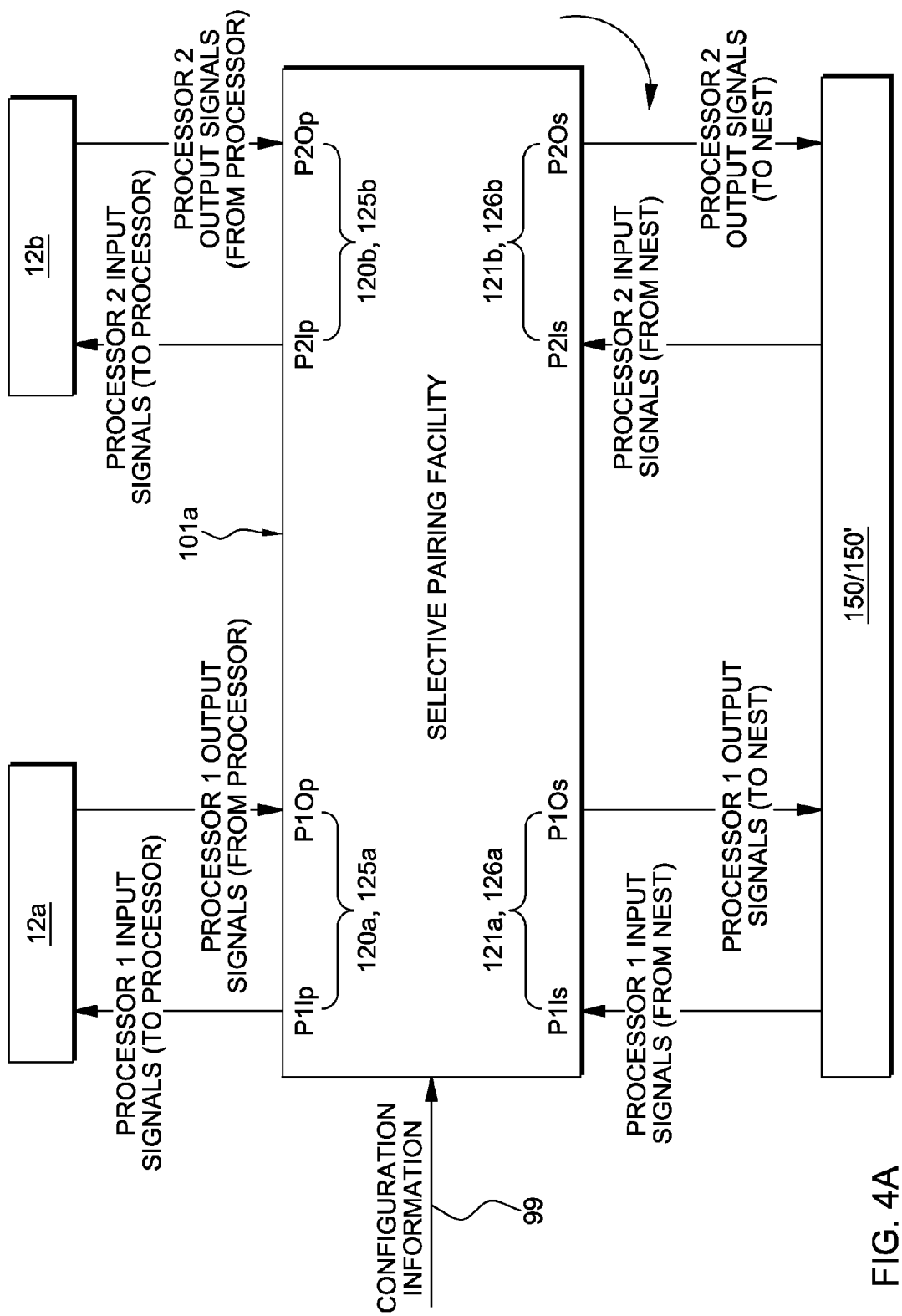
FIG. 4A depicts an example pairing facility 101a connecting to at least two processor cores 12a, 12b.

More particularly, with respect to the configuration of pairing facilities 100a, 100b, etc. shown in FIGS. 3A, 3B or pairing facilities 101a, 101b, etc. shown in FIG. 3C several architectures are embodied. For example, as shown in FIG. 4A, a pairing facility 101a connects to at least two cores 12a, 12b, the pairing facility having as inputs the respective output signals from the respective cores (herein referred to as P1Op and P2Op in FIGS. 4A-4B) that correspond to signals 125a, 125b and are communicated over respective conductors (signal lines) for transmission from a respective microprocessor core to other system components (the "memory nest") via the switch 150/150'. Pairing facility 101a also connects to at least two cores 12a, 12b, the pairing facility having as outputs the respective input signals 120a, 120b to the input signals of the respective cores (herein referred to as processor inputs P1Ip and P2Ip) that correspond to signals being received by a microprocessor core from other system components. In addition, the pairing facility 101a also includes outputs for connection with other system components via the switch 150/150' corresponding to the outputs of the processor cores 126a, 126b (indicated as processor output signals P1Os and P2Os in FIG. 4A), and includes inputs 121a, 121b (indicated as processor input signals P1Is and P2Is) from the other system components via switch 150/150' corresponding to the inputs of processor cores 12a, 12b respectively. In addition, the selective pairing facility has configuration inputs and diagnostic outputs, allowing management of selective pairing.

Figure 4B:
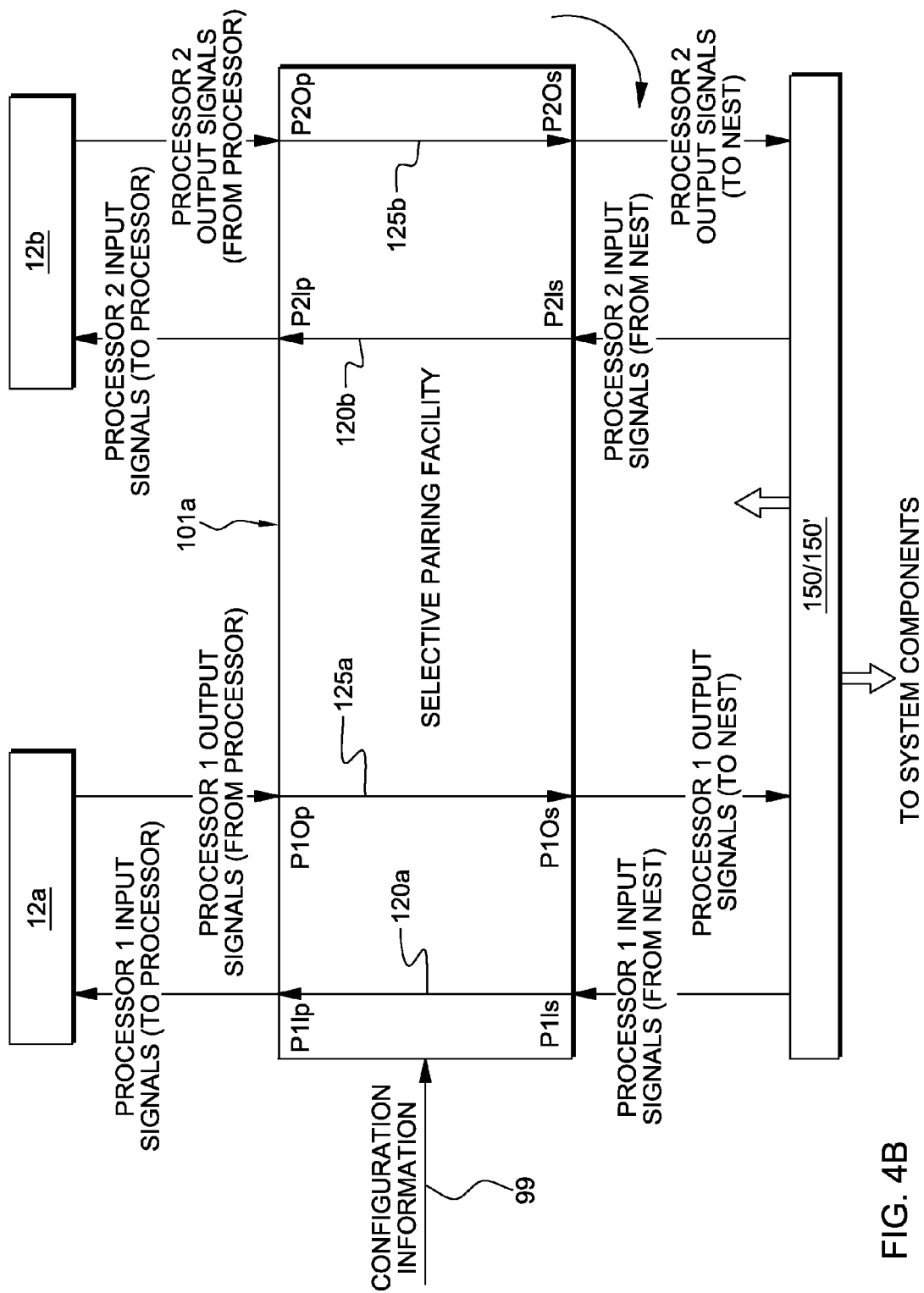
FIG. 4B depicts an example pairing facility 101a connecting to at least two processor cores 12a, 12b wired for individual (non-paired mode of operation)

In one aspect, each pairing facility 100a, 100b, ..., 101a, 101b, etc. has two modes of operation—in a first, high performance mode of operation, depicted in FIG. 4B, the system is configured such as to "pass through" the signals from both cores. In this first operation mode, the operational paths are to independently connect the inputs of each core, e.g., microprocessor cores 12a, 12b to the corresponding system (e.g., memory nest, I/O controller, etc.) interfaces (not shown) via switch 150/150', making both processor cores independently available to software. That is, in response to configuration information 99 such as from an Operating System (O/S), a scheduler, user program, control program and/or programmed configuration registers (not shown) indicating a first mode of operation, the facility 101a, is configured as shown in FIG. 4B for independent processor core operation where processor core 12a communicates with the system components (not shown) via the switch 150/150' via signal line 120a connecting P1Is to processor core input P1Ip, and signal line 125a connecting processor core output P1Op to the system input at P1Os; and, is configured for independent processor core operation as shown in FIG. 4B where processor core 12b communicates with the system components (not shown) via the switch 150/150' via signal line 120b connecting P2Is to processor core input P2Ip, and signal line 125b connecting processor core output P2Op to the system input at P2Os. It is understood that signal lines 120a, 120b and 125a, 125b includes a variety of conductive structures as would be found in a single or multiprocessing system including, but not limited to: a bus which may comprises one or more busses in serial or parallel configurations, e.g., data busses, address busses, a system bus, an I/O bus, and a PCI bus, bus controllers, control signal and interrupt signal lines, etc.

Figure 4C:
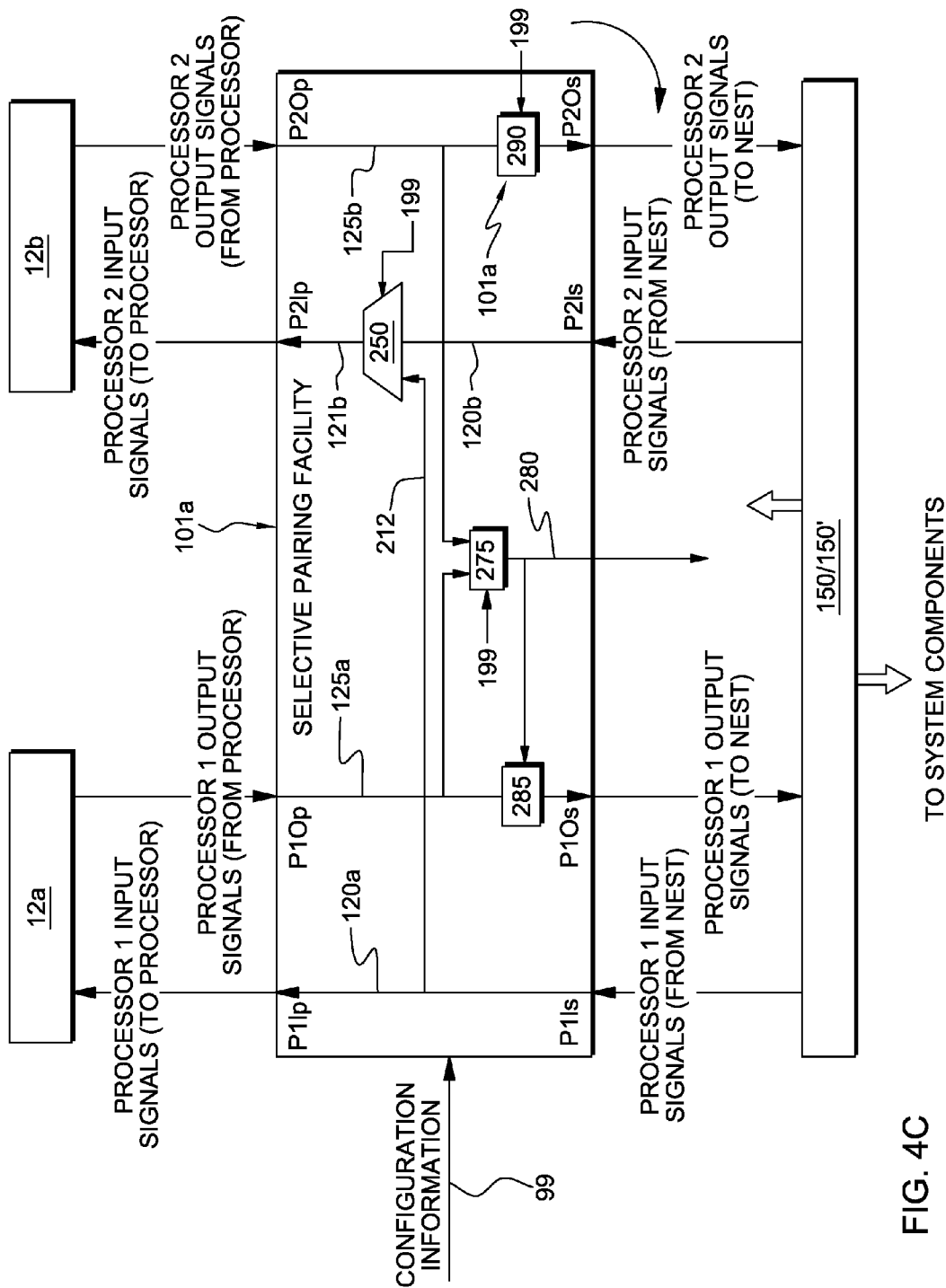
FIG. 4C depicts an example pairing facility 101a connecting at least two processor cores 12a, 12b wired for highly reliable paired mode of operation according to one embodiment.

In the second, high reliability mode of operation, as depicted in FIG. 4C, at least one core 12b is configured to check the execution of its paired core 12a, which connects to the system nest (not shown) via the switch 150/150'. As shown in FIG. 4C, the checker core 12b is not connected to the system components (not shown) via the switch 150/150' in this mode, but rather receives the same inputs as the checked core 12a, and its outputs are compared by comparison logic 275 with the output of the checked core. Thus, as shown in FIG. 4C, via signal line 120a from a system component to a processor core 12a, signals 212 communicated over port P1Is and destined for input to processor core 12a via a configured pairing facility, e.g., 101a, are simultaneously provided as an input to processor core 12b for highly reliable operations. In one embodiment of the paired mode depicted in FIG. 4C, a configuration signal 199 indicating the paired mode of operation, is input to a multiplexor ("Mux") element 250 to configure the mux 250 to receive and select (pass through) only the input signal(s) 212 for input via port P2Ip to the processor/core 12b provided over mux output conductor 121b. Thus, in the paired mode, processor cores 12a and 12b both receive identical input signals carried on signals line 120a and 121b and may comprise one or more address, data, system, control, 110, instruction or interrupt signals. Further, in the second paired mode of operation, both outputs of each processor core carried on signals lines (busses) 125a, 125b are compared for high-reliable operation. Thus, in the paired mode of operation as shown in the configured pairing facility of FIG. 4C, outputs of the processor 12a via port P1Op and signal line 125a are input to a decision logic device 275, e.g., a comparator; and, likewise, outputs of the processor 12b via port P2Op and signal line 125b are input to a decision logic device 275 that compares the respective processing core outputs. Depending upon the comparison results, an output of the comparator may indicate an error (result mismatch) via signal line 280, or provide an error-free indication, e.g., either by the absence of an error indication on signal line 280, or using an additional distinct signal line.

Further, output enable logic blocks 285 and 290 are provided to control the output signals P1Os and P2Os of respective processor 1 and processor 2 devices to the switch 150/150'. The output enable logic 290 controls and enables the processor output signals P2Op to be transmitted as P2Os signals to the switch 150/150'. The controlling signal is the configuration signal 199 indicating the paired mode of operation. In the paired mode of operation, the signal P2Op is disabled, and not driven to the P2Os signal. Similarly, the output enable logic 285 controls and enables the output signals P1Op to be transmitted as P1Os signals to the switch 150/150'. The controlling signal for this output enable logic 285 is the error signal 280 indicating that the results from the paired processors do not match, and that error happened, and no results should be sent into the switch 150/150' to system components.

Those skilled in the art will understand that "not driven" refers to not presenting requests received as signal P2Op as output P2Os, and indicating an absence of requests or transactions. The signaling protocol is dependent upon a specific implementation, and "not driven" may be implemented by a number of signaling means, including driving one or more signals to a high impedance value, or to a value or combination of values representing the absence of requests.

In accordance with the checking facility, the behavior of the pairing function and including the checking facility to implement a configured first mode or second mode of operation of the pairing facility such as configured facility 101a of FIG. 4B may be implemented by the following example VHDL pseudocode as follows where checker is processor 12b and checkee the processor 12a:

```
If (mode = passthru)
    P1Ip <= P1Is;
    P1Os <= P1Op;
    P2Ip <= P2Is;
YOR920100418US1
    P2Os <= P2Op;
Else -- (mode = paired)
    P1Ip <= P1Is;
    P1Os <= P1Op;
    P2Ip <= P1Is;
    Correct_execution <= (P1Op = P2Op); -- compare output of checker
        and checkee
End if;
```

Those skilled in the art will understand that at one time, more than two (2) cores can be paired, wherein two (2) cores may receive identical inputs as the checkee core and used as checker cores. Further, in one alternate embodiment, when more than two (2) cores are attached to a pairing facility, voting can be used to determine the output when executing in paired mode.

In another aspect, system software is provided that enables a computing machine to perform the function of: 1) configuring two hardware cores as a single highly reliable cores; 2) de-configuring a highly reliable core into two separate cores; 3) scheduling an application, or a portion thereof, to a highly reliable core responsive to an indication that said application (or application portion) should be executed on a reliable core; and 4) scheduling an application, or portion thereof, to a single unreplicated core responsive to an indication that said application (or application portion) is resilient.

Figure 5:
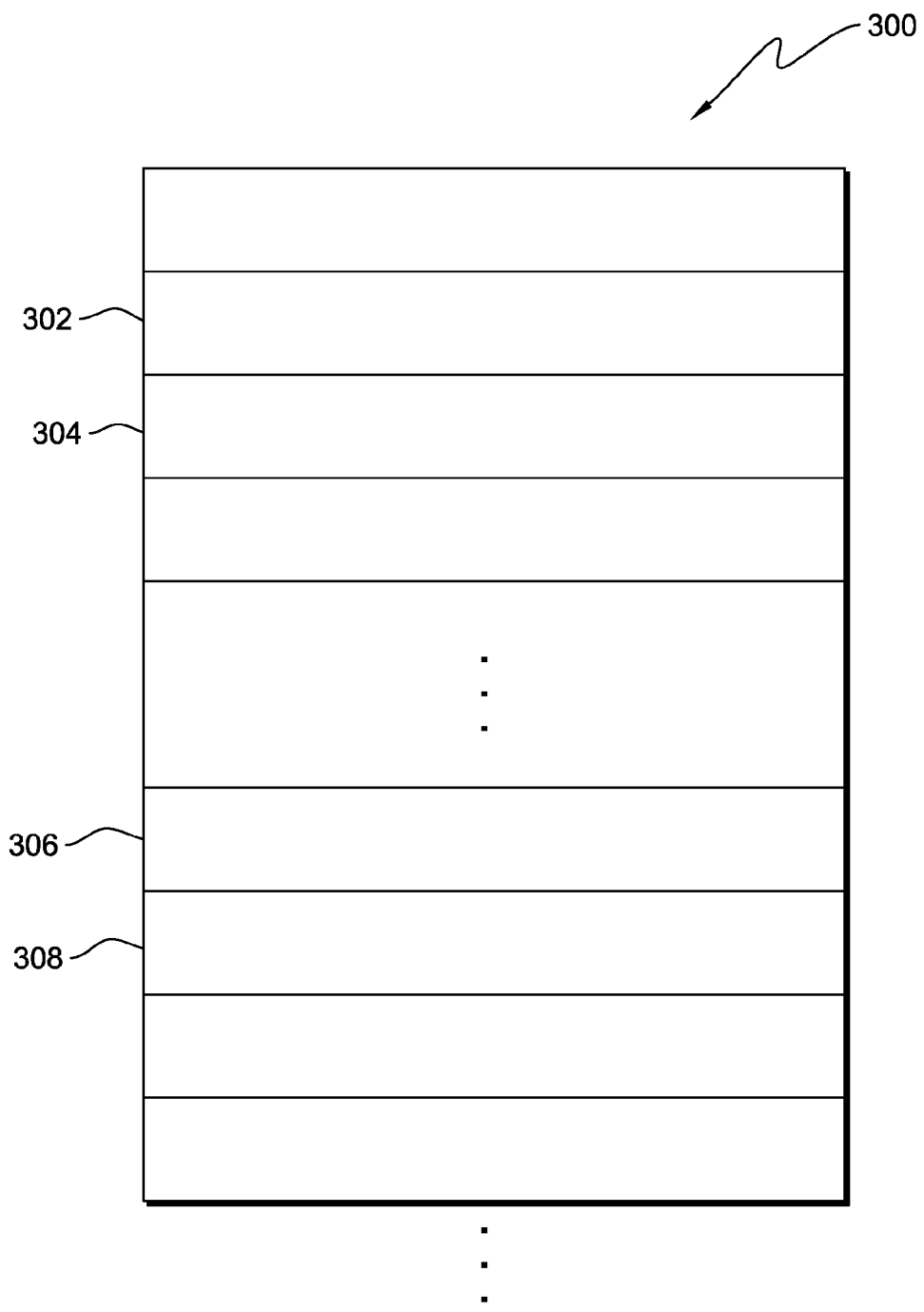
FIG. 5 depicts conceptually an example high performance computing application 300 running on a multiprocessor computing system that employs the selective pairing facility in one embodiment.

FIG. 5 depicts conceptually an example high performance computing application 300 running on a multiprocessor computing system that employs the selective pairing facility in one embodiment. As shown in FIG. 5, in accordance with an exemplary application-configured system, application 300 includes code portions 302, 304, 306, 308. In one embodiment, code portions 304, 308 may include incorporated in the programmed code fault tolerant algorithms that do not require redundant paired cores for high reliability operation. Reliability of the software program is achieved by using a high-reliability algorithm with internal built in checking, for example, by implementing convergence based algorithm. However, within the same program, computing portions 302, 306 may include specific call-outs to configure the system to operate in a high reliability paired mode, i.e., the operating system will implement the switching to pair two processor (hardware) cores as a single highly reliable (virtual) core such that the selected paired cores can run a single thread in the higher reliability mode. In this mode, one processor core will check the results of the other processor core to ensure high reliability. That is, the operating system will populate operation registers at each of the two paired cores for performing the same programmed operations.

Thus, in the exemplary system, a computing application 300 includes a resilient application portion 304, as such based on an iterative convergence algorithm, and a control and calculation logic portion 302 which is less intrinsically resilient. In such an embodiment, the application 300 executes code section 302 by configuring the system with a first (typically, but not necessarily, smaller) number of threads to perform initialization and initial configuration using paired hardware-resilient cores such as depicted in FIG. 4C. The threads of the application are then synchronized, e.g., using a known barrier synchronization method, as known to those skilled in the art, and after the barrier synchronization, the application portion 304 requests a reconfiguration call-out to deconfigure hardware pairing. After hardware pairing has been deconfigured resulting in a system architecture such as depicted in FIG. 4B, the application is dispatched with a second number of threads. In one embodiment, this is a larger number of parallel threads. In another embodiment, the same or fewer threads are scheduled, making additional threads available to other applications, or de-energizing unused threads for power conservation. After parallel computation of the resilient application portion 304, another barrier sync is performed. After barrier synchronization, in code portion 306 there include call-outs to reconfigure the system to use hardware-resilient paired cores is performed, and the less intrinsically resilient application portion 306 is performed.

Figure 6:
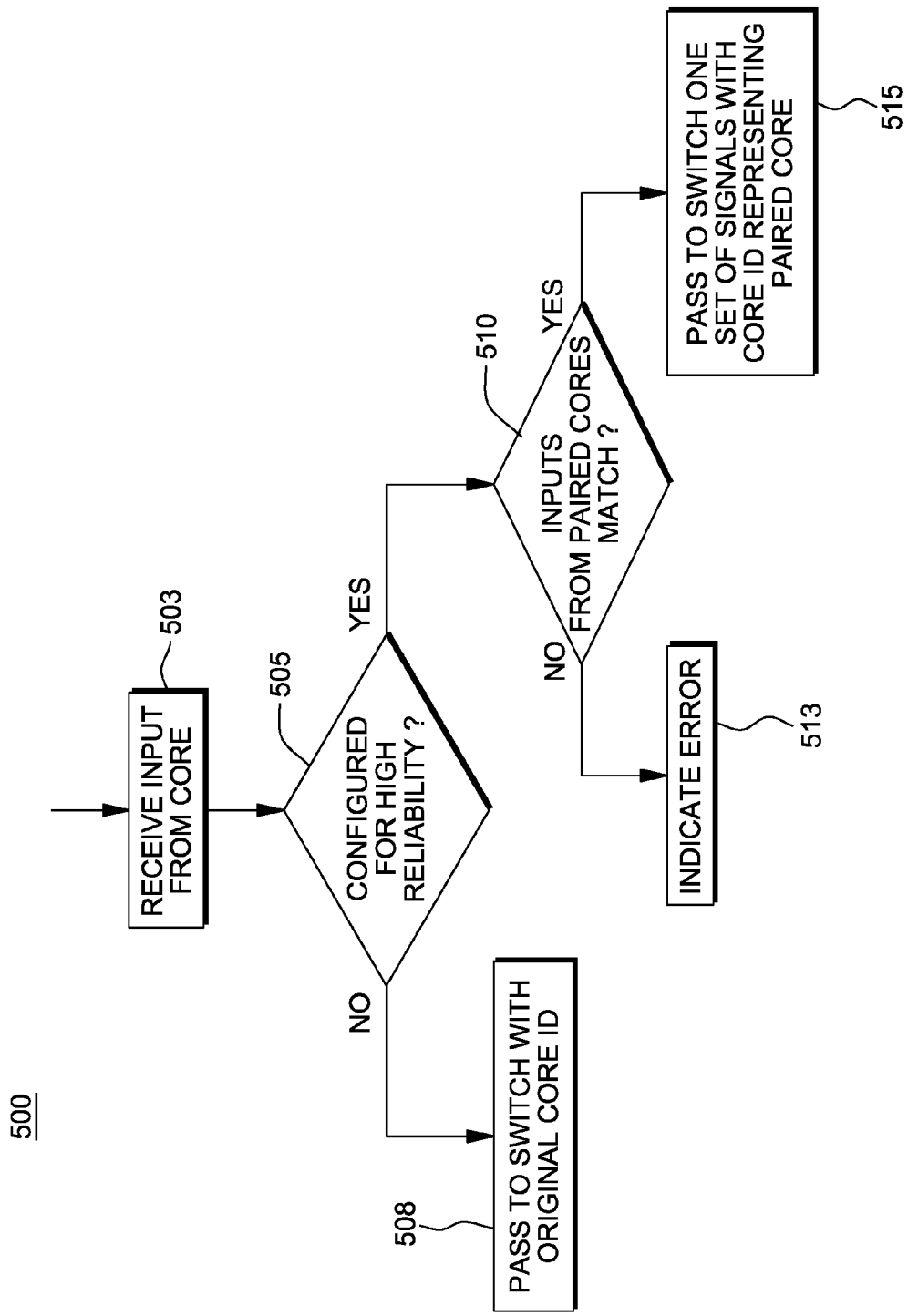
FIG. 6 depicts a methodology 500 employed at the pairing facility with reliability checking in response to receipt of data from a microprocessor according to one embodiment.

FIG. 6 depicts a methodology 500 employed at the pairing facility with reliability checking in response to receipt of data from a microprocessor. At step 503, there is depicted the receipt at the pairing facility of data from a microprocessor core. At 505, a determination is made as to whether the microprocessor core has been configured for paired mode of operation (high reliability). If at 505 it is determined that the microprocessor core has not been configured for paired mode of operation, then the pairing facility is configured according to facility 101a shown in FIG. 4B. Thus, as shown at 508, the original core ID of the processor from which the data is provided is passed to the switch with the data at the pairing facility, for example, such that the data is passed through the facility to a switch or the system "nest", without checking by a paired ("checker") processor.

Otherwise, if at 505, it is determined that the microprocessor core has been configured for high reliability (i.e., paired mode of operation), then the pairing facility is configured according to facility 101a shown in FIG. 4C. In this example, for instance, data comprises processing results sent from processor 12a, for example, received from line 125a (shown in FIG. 4C). However, in this highly reliable mode of operation, as shown at 510, a determination is then made as to whether the inputs from the paired core match. That is, in view of FIG. 4C selective pairing configuration for high reliability, it would be determined by comparator 275 (of FIG. 4C) whether the data comprising processing results of the paired processor device 12b, for example, received at line 125b matches the data received at the facility from processor 12a along line 125a at the pairing facility. If at step 510 it is determined that the data input from its paired core 12b does not match the result data being input from the processor core 12a, then a compare result error is flagged at 513 indicating a potential hardware failure at one of the cores. In this scenario, the error is generated as error signal 280 (FIG. 4C) which is further processed by the configuration logic at the paired facility for further action. In one embodiment, this error initiates an interrupt routine. For example, in one embodiment, it can not be determined which core has an error, only that an error occurred; and since as the correct result is not known, the result is discarded. Otherwise, if at step 510 it is determined that the data input from its paired core 12b does match the result data being input from the processor core 12a, then at 515, one set of signals (e.g., data) is passed through the facility to the switch or the system "nest" with a core ID representing the paired cores.

Figure 7:
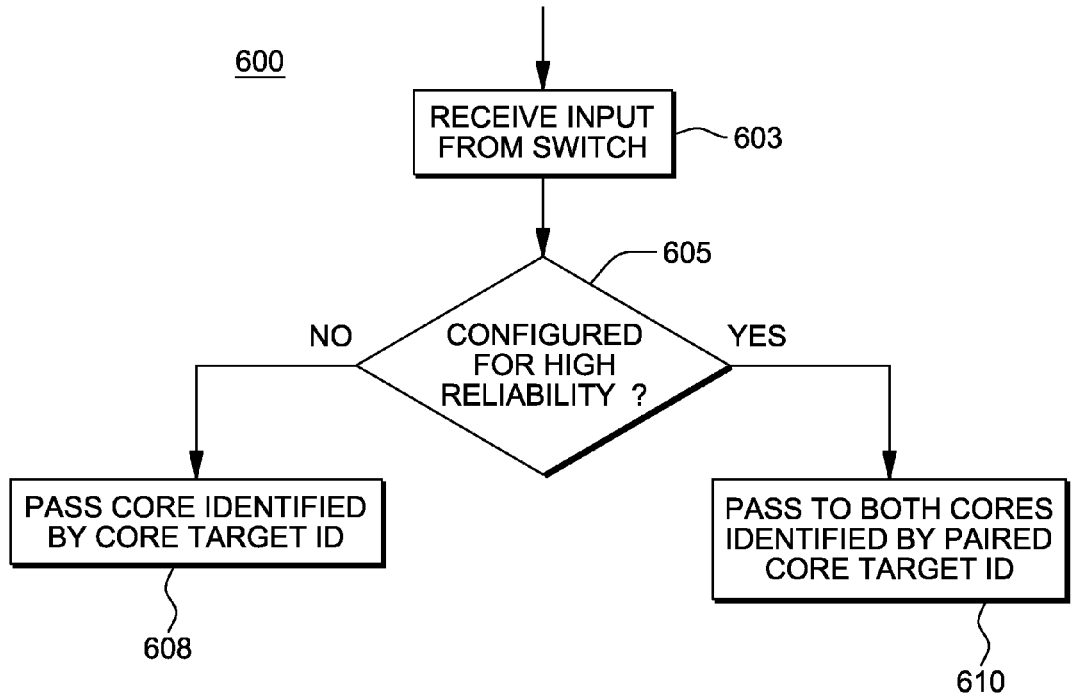
FIG. 7 depicts a methodology 600 employed at the pairing facility with reliability checking in response to receipt of data from the system nest via the switch/bus according to one embodiment.

FIG. 7 depicts a methodology 600 employed at the pairing facility with reliability checking in response to receipt of data from the system nest, e.g., via the switch/bus according to one embodiment. At step 603, there is depicted the receipt at the pairing facility of data from the switch/bus. At 605, a determination is made as to whether the system is configured for highly reliable (paired) mode. If the system is not configured for highly reliable (paired) mode, then the pairing facility is configured according to facility 101a shown in FIG. 4B. In this instance, at 608, the received (input) data from the system "nest" is passed directly to the processor core, e.g., core 12a, identified by the core target ID via signal line 120a for input to processor core 12a. Otherwise, if at 605, it is determined that the microprocessor core has been configured for high reliability (i.e., paired mode of operation), then the pairing facility is configured according to facility 101a shown in FIG. 4C. In this mode of operation, for instance, data received from system "nest", for example, received at line 120a (shown in FIG. 4C) is input to both paired processor cores 12a, 12b identified by a paired core ID. That is, in such an embodiment, as indicated at 610, FIG. 7, control signals are generated to configure the mux element 250 to additionally receive and select (pass through) to paired processor core 12b those received signals received for processor core 12a according to a paired core target ID.

Figure 8:
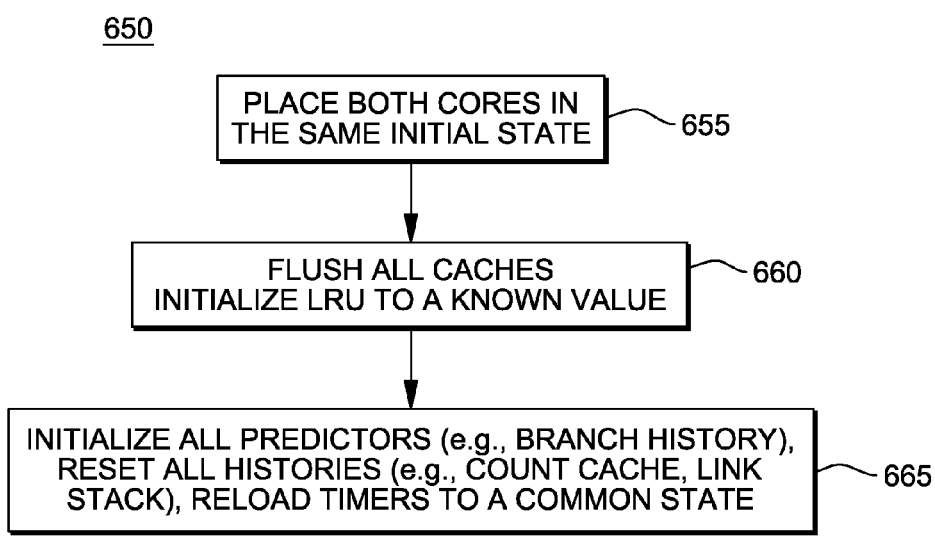
FIG. 8 depicts a method 650 of configuring of the paired cores for a checker/checkee relationship in order to ensure lockstep execution on a cycle-by-cycle basis in one embodiment.

In one aspect of the invention, configuring of the paired cores for a checker/checkee relationship as described herein, requires initialization of both cores in a common microarchitectural state in order to ensure lockstep execution on a cycle-by-cycle basis. In one embodiment, as shown in FIG. 8, a method 650 of rendering the pairing facility and selected paired cores for a checker/checkee relationship include, but not limited to: the following steps: 1) placing both cores in same initial state to have exactly same execution sequence at 655; 2) flushing all cache state and initialize LRU (Least Recently Used) information to a known value at 660; and, 3) initiating, at 665, all predictors to a common state which may include branch history, count cache, link stack, a reset of all histories; a reloading of timers, etc. In one aspect, this initialization for paired core operations can be performed by a code sequence, or micro-code, a combination of ABIST and state machines. In one embodiment, ABIST and state machines are used as advantageously not having side effects (e.g., warming up predictor); and, 4) starting execution at same time, e.g., via a common external exception.

It should be understood that the principles of the invention described herein are equally applicable to the both configuring and de-configuring of paired cores, responsive to a system operator (e.g., the partitioning of high reliability and higher performance cores is performed under control of a system operator, and fixed for the duration of execution until a next operator reconfiguration), responsive to an application indication requesting specific configuration, or autonomically by the operating system.

In one multiple processing chip embodiment having a plurality of cores, it is understood that there are many types of processors/cores which may be used or even required for different applications, e.g., processors with accelerators, processors without acceleration, processors dedicated for handling cryptographic operations, protocol conversion, etc. However, selective core pairing facility, whether initiated by an operator, explicit program call-outs, or as determined by a compiler, is responsive to the configuration instructions received, and in the paired mode, the selected paired hardware cores and data/bus configurations to each of those cores are matched, i.e., are identical, for the fault tolerant operations.

Figure 9:
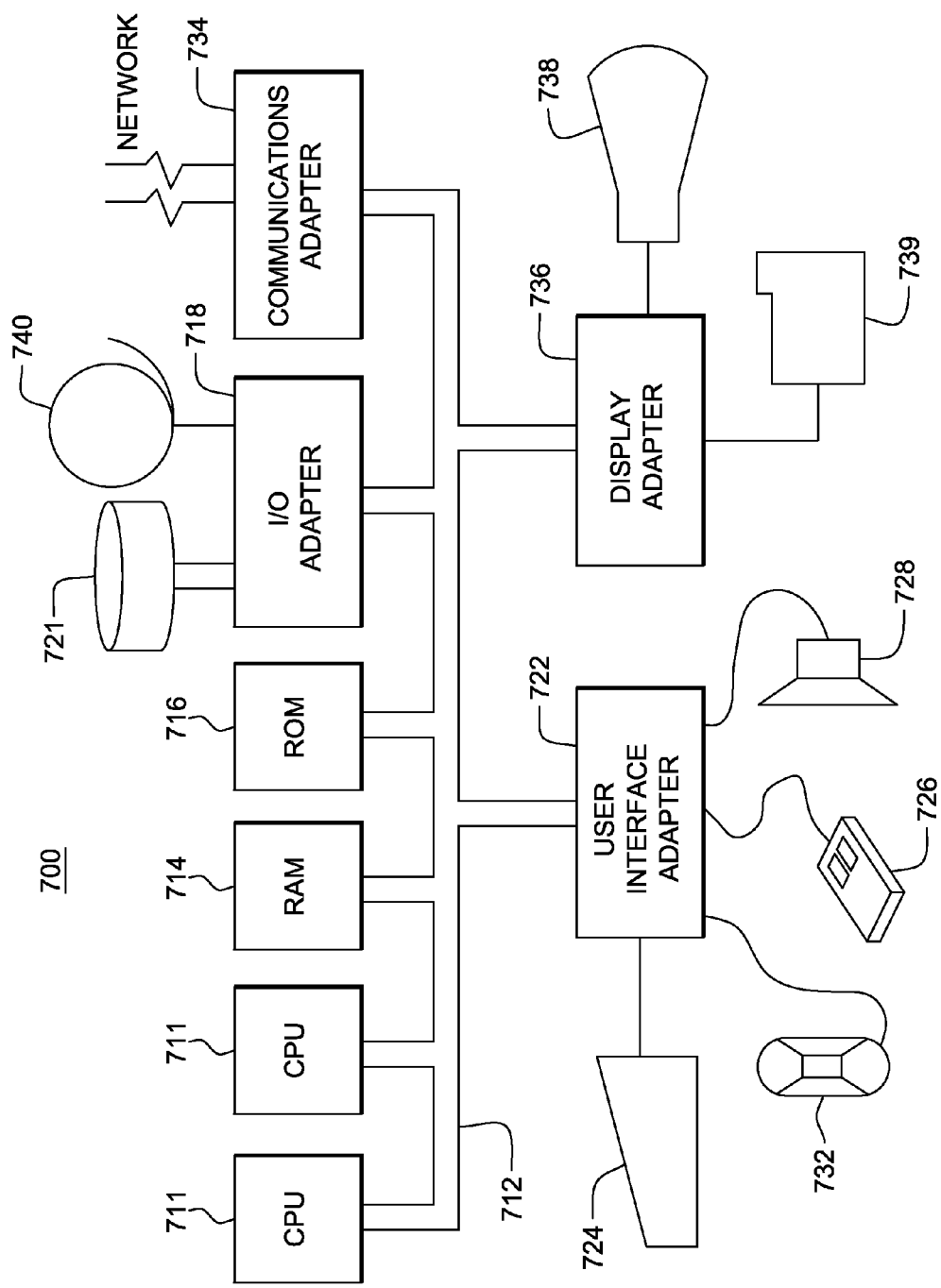
FIG. 9 illustrates an exemplary hardware configuration for implementing the flow charts depicted in FIGS. 6-8 in one embodiment.

FIG. 9 illustrates an exemplary hardware configuration of a computing system 700 running and/or implementing the method steps described herein. The hardware configuration preferably has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting the system 700 to a data processing network, the Internet, an Intranet, a local area network (LAN), etc., and a display adapter 736 for connecting the bus 712 to a display device 738 and/or printer 739 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

Having thus described our invention, what we claim as new, and desire to secure by Letters Patent is:

1. A multiprocessing computer system comprising:
a memory system including a memory storage device;
a plurality of processor cores in communication with said memory system;
a crossbar switch device connected to said memory system having input output ports and respective input output signal lines configurable to route data and address signals between said memory system and a processor core;
a plurality of pairing sub-systems, each pairing sub-system attached to said ports of said crossbar switch, and each pairing sub-system adapted to dynamically configure two of said plurality of processor cores for independent parallel operation in response to receipt of first configuration information, each said pairing sub-system providing at least two separate signal I/O paths between said crossbar switch and each respective one of said two processor cores for said independent parallel operation, and each said pairing sub-system configured to dynamically pair two of said plurality of processor cores for fault tolerant operations in response to receipt of second configuration information, said pairing sub-system providing a common signal path for forwarding identical input data via said crossbar switch to each said paired two processor cores identified by a paired core ID for simultaneous processing thereat;

a control device generating control signals to dynamically configure said crossbar switch device to route signals according to said either said independent parallel operation and fault tolerant operations at a paired processing core according to an identified paired core ID, wherein multiple pairs of processor devices are dynamically configurable for either said independent parallel operation and fault tolerant operations; and decision logic device, in said pairing sub-system, for receiving an output of each said paired two processor devices when configured for fault tolerant operations and comparing respective output results of each, said decision logic device generating error indication upon detection of non-matching output results or passing matching results through said paring sub-system to the crossbar switch with the core ID representing the paired processing cores.

2. The multiprocessing system as in claim 1, wherein said at least two separate signal I/O paths in said pairing sub-system when configured for independent parallel operation comprises:

a first signal path between said crossbar switch and a first processor core configured to route data from said memory system to said first processing core, and, a second signal path between said crossbar switch and said second processor core configured to route data from said memory system to said second processing core, and, a third signal path between said crossbar switch and said first processor core configured to route output results data from said first processor core to said memory system, and, a fourth signal path between said crossbar switch and said second processor core configured to route output results data from said second processor core to said memory system.

3. The multiprocessing system as in claim 2, wherein said pairing sub-system further comprises:

a multiplexer device having at least one input for receiving data forwarded on said second signal path from said crossbar switch for independent parallel operation in response to said first configuration information, and having an output for connection with a second processor core for providing said data received on said second signal path to said second processor core.

4. The multiprocessing system as in claim 3, wherein said common signal path comprises:

a fifth signal path connection between said first signal path and an input of said multiplexer device, wherein said data forwarded on said first signal path to said first processor core is simultaneously routed, as an identical input, to said second processor core via said multiplexer device for performing fault tolerant operations in response to receipt of said second configuration information.

5. The multiprocessing system as in claim 3, wherein said pairing sub-system further comprises, in response to receipt of said second configuration information:
- a sixth signal path configured for connecting said third signal path to a first input of said decision logic device; and,
- a seventh signal path configured for connecting said fourth signal path to a second input of said decision logic device, said decision logic device comparing respective output results received at each said first and second inputs via respective sixth and seventh signal paths.

6. The multiprocessing system as in claim 5, wherein said crossbar switch device routes data and address signals between said memory system and said at least two processor cores via said first, second, third, fourth, fifth, sixth and seventh signal paths of said pairing sub-system, wherein said pairing sub-system interfaces said crossbar switch device to said at least two processor cores and is situated internal to said crossbar switch device, or situated external to said crossbar switch device.

7. The multiprocessing system as in claim 5, comprising:
a bus device including conductive signal lines configurable to route signals between said memory system and said at least two processor cores via said first, second, third, fourth, fifth, sixth and seventh signal paths of said pairing sub-system, wherein said pairing sub-system interfaces said bus device to said at least two processor cores; and,
bus control device for generating signals to configure said bus device to route signals according to said independent parallel operation, or highly-reliable fault tolerant operation.

8. The multiprocessing system as in claim 5, including a processing device running a software application having a first code portion with an indicator to dynamically configure at least two of said at least two processors for independent parallel operation at said pairing sub-system; and, having a second code portion with an indicator to dynamically configure at least two of said at least two processors for highly-reliable fault tolerant operations at said pairing sub-system.

9. The multiprocessing system as in claim 5, wherein each said two processor cores run a software application independently, said pairing sub-system providing said at least two separate signal I/O paths between said memory system and each respective said two processor cores for independent parallel operation; or, wherein each said at least two processor cores run an identical software application, said pairing sub-system adapted to pair said two processor cores for said highly-reliable fault tolerant operations.

10. The multiprocessing system as in claim 5, wherein responsive to said second configuration information, said pairing facility further initializing each of said paired cores for a checker/checkee relationship, and configuring each of said paired cores in a common microarchitectural state to ensure lockstep execution on a cycle-by-cycle basis.

11. The system as in claim 1, wherein to dynamically configure two of said plurality of processor cores for paired fault tolerant operation mode, said pairing sub-system selecting a particular processor core for pairing known to accommodate a particular type of high-reliability processing attribute.

12. The system as in claim 11, wherein said particular type of high-reliability processing attribute comprises: a processor core with accelerator, processor core dedicated for handling cryptographic operations, a processor core dedicated for handling protocol conversion, a processor core of particular processing speed, registers, or memory adapted for handling particular types of high-reliability processing.

13. A method for performing highly-reliable fault tolerant operations in a multiprocessing system including a plurality of processor cores in communication with a memory system, said method comprising:
configuring a crossbar switch device having input output ports and respective input output signal lines to route data and address signals between said memory system and a processor core;
dynamically configuring, in at least one of multiple pairing sub-systems attached to said ports of said crossbar switch, two of said plurality of processor cores for independent parallel operation mode in response to receipt of first configuration information at said pairing sub-system, said dynamic configuring in response to receipt of first configuration information includes providing at least two separate signal I/O paths between said crossbar switch and each respective one of said two processor cores for said independent parallel operation, and
dynamically configuring, in another of said multiple pairing sub-systems, two of said plurality of processor cores for paired fault tolerant operation mode in response to receipt of second configuration information, said dynamic configuring in response to said second configuration information includes providing a common signal path for forwarding identical input data via said crossbar switch to each said paired two processor cores identified by a paired core ID for simultaneous processing thereat;
generating, by a control device, control signals to dynamically configure said crossbar switch device to route signals according to said either said independent parallel operation and fault tolerant operations at a paired processing core according to an identified paired core ID, wherein multiple pairs of processor devices are dynamically configurable for either said independent parallel operation and fault tolerant operations; and
receiving, at a decision logic device in said pairing sub-system, an output of each said paired two processor devices configured in said paired fault tolerant operation mode;
comparing respective output results of each said paired two processor devices; and,
generating, at said decision logic device, an error indication upon detection of non-matching output results or passing matching results through a paring sub-system to the crossbar switch with a core ID representing the paired processing cores.

14. The method as in claim 13, wherein said providing at least two separate signal I/O paths in said pairing sub-system when configured for independent parallel operation mode comprises:
forming a first signal path between said crossbar switch and a first processor core configured to route data from said memory system to said first processing core, and,
forming a second signal path between said crossbar switch and a second processor core configured to route data from said memory system to said second processing core, and,
forming a third signal path between said crossbar switch and said first processor core configured to route output results data from said first processor core to said memory system, and,
forming a fourth signal path between said crossbar switch and said second processor core configured to route output results data from said second processor core to said memory system.

15. The method as in claim 14, further comprising:
configuring, in said pairing sub-system, a multiplexer device having at least one input and an output for connection with a second processor core, wherein said configuring comprising:
receiving, at said multiplexer device, data forwarded on said second signal path from said crossbar switch for independent parallel operation in response to said first configuration information, said second processor core receiving said data received from said second signal path at said multiplexer output.

16. The method as in claim 15, wherein said providing a common signal path comprises:
forming a fifth signal path connection between said first signal path and an input of said multiplexer device, wherein said data forwarded on said first signal path to said first processor core is simultaneously routed, as an identical input, to said second processor core via said multiplexer device for performing fault tolerant operations in said paired fault tolerant operation mode.

17. The method as in claim 16, wherein said pairing sub-system further comprises, in said paired fault tolerant operation mode:
forming a sixth signal path for connecting said third signal path to a first input of said decision logic device; and,
forming a seventh signal path for connecting said fourth signal path to a second input of said error correcting device, said decision logic device comparing respective output results received at each said first and second multiplexer device inputs via respective sixth and seventh signal paths.

18. The method as in claim 17,
wherein said crossbar switch device routes data and address signals between said memory system and said at least two processor cores via said first, second, third and fourth signal paths of said pairing sub-system, wherein said pairing sub-system interfaces said crossbar switch device to said at least two processor cores.

19. The method as in claim 17, further comprising:
configuring a bus device including conductive signal lines to route signals between said memory system and said at least two processor cores via said first, second, third, and fourth signal paths of said pairing sub-system, wherein said pairing sub-system interfaces said bus device to said at least two processor cores; and,
generating signals, at a bus control device, to configure said bus device to route signals according to said independent parallel operation, or highly-reliable fault tolerant operation.

20. The method as in claim 15, comprising:
running a software application on a processing device in said multiprocessing system, said software application including a first code portion with an indicator to dynamically configure two of said at least two processors for independent parallel operation at said pairing sub-system; and, having a second code portion with an indicator to dynamically configure two of said at least two processors for highly-reliable fault tolerant operations at said pairing sub-system.

21. The method as in claim 16, wherein each said two processor cores run a software application independently, said method comprising: configuring said pairing sub-system to provide said at least two separate signal I/O paths between said memory system and each respective said two processor cores for independent parallel operation; or, wherein each said two processor cores run an identical software application requiring highly-reliability, said method comprising: configuring said pairing sub-system adapted to pair said two processor cores for said highly-reliable fault tolerant operations.

22. The method as in claim 16, wherein responsive to said second configuration information, said method further comprising:
configuring each of said paired cores in a common microarchitectural state to ensure lockstep execution on a cycle-by-cycle basis.

23. The method as in claim 13, wherein said dynamically configuring two of said plurality of processor cores for paired fault tolerant operation mode further comprises:
selecting a particular processor core for pairing known to accommodate a particular type of high-reliability processing attribute.

24. The method as in claim 23, wherein said particular type of high-reliability processing attribute comprises: a processor core with accelerator, processor core dedicated for handling cryptographic operations, a processor core dedicated for handling protocol conversion, a processor core of particular processing speed, registers, or memory adapted for handling particular types of high-reliability processing.

25. A computer program product for performing highly-reliable fault tolerant operations in a multiprocessing system including a plurality of processor cores in communication with a memory system, the computer program device comprising a storage medium readable by a processing circuit and storing instructions run by the processing circuit for performing a method, the method comprising:
configuring a crossbar switch device having input output ports and respective input output signal lines to route data and address signals between said memory system and a processor core;
dynamically configuring, in at least one of multiple pairing sub-systems attached to said ports of said crossbar switch, two of said plurality of processor cores for independent parallel operation mode in response to receipt of first configuration information at said pairing sub-system, said dynamic configuring in response to receipt of first configuration information includes providing at least two separate signal I/O paths between said crossbar switch and each respective one of said two processor cores for said independent parallel operation, and
dynamically configuring, in another of said multiple pairing sub-system, two of said plurality of processor cores for paired fault tolerant operation mode in response to receipt of second configuration information, said dynamic configuring in response to said second configuration information includes providing a common signal path for forwarding identical input data via said crossbar switch to each said paired two processor cores for simultaneous processing thereat;
generating, by a control device, control signals to dynamically configure said crossbar switch device to route signals according to said either said independent parallel operation and fault tolerant operations at a paired processing core according to an identified paired core ID, wherein multiple pairs of processor devices are dynamically configurable for either said independent parallel operation and fault tolerant operations; and
receiving, at a decision logic device in said pairing sub-system, an output of each said paired two processor devices configured in said paired fault tolerant operation mode;
comparing respective output results of each said paired two processor devices; and,
generating, at said decision logic device, an error indication upon detection of non-matching output results or passing matching results through a paring sub-system to the crossbar switch with a core ID representing the paired processing cores.

26. The computer program product as in claim 25, wherein said providing at least two separate signal I/O paths in said pairing sub-system when configured for independent parallel operation mode comprises:
   forming a first signal path between said crossbar switch and a first processor core configured to route data from said memory system to said first processing core, and,
   forming a second signal path between said crossbar switch and a second processor core configured to route data from said memory system to said second processing core, and,
   forming a third signal path between said crossbar switch and said first processor core configured to route output results data from said first processor core to said memory system, and,
   forming a fourth signal path between said crossbar switch and said second processor core configured to route output results data from said second processor core to said memory system.

27. The computer program product as in claim 26, further comprising:
   configuring, in said pairing sub-system, a multiplexer device having at least one input and an output for connection with a second processor core, wherein said configuring comprising:
   receiving, at said multiplexer device, data forwarded on said second signal path from said crossbar switch for independent parallel operation in response to said first configuration information, said second processor core receiving said data received from said second signal path at said multiplexer output.

28. The computer program product as in claim 27, wherein said providing a common signal path comprises:
   forming a fifth signal path connection between said first signal path and an input of said multiplexer device, wherein said data forwarded on said first signal path to said first processor core is simultaneously routed, as an identical input, to said second processor core via said multiplexer device for performing fault tolerant operations in said paired fault tolerant operation mode.

29. The computer program product as in claim 28, wherein said pairing sub-system further comprises, in said paired fault tolerant operation mode:
   forming a sixth signal path for connecting said third signal path to a first input of said decision logic device; and,
   forming a seventh signal path for connecting said fourth signal path to a second input of said error correcting device, said decision logic device comparing respective output results received at each said first and second multiplexer device inputs via respective sixth and seventh signal paths.

* * * * *